(12) United States Patent
Lemmerhirt

(10) Patent No.: US 8,315,125 B2
(45) Date of Patent: Nov. 20, 2012

(54) SYSTEM AND METHOD FOR BIASING CMUT ELEMENTS

(75) Inventor: David F. Lemmerhirt, Ann Arbor, MI (US)

(73) Assignee: Sonetics Ultrasound, Inc., Ann Arbor, MI (US)

( * ) Notice: Subject to any disclaimer, the term of this patent is extended or adjusted under 35 U.S.C. 154(b) by 303 days.

(21) Appl. No.: 12/727,143

(22) Filed: Mar. 18, 2010

(65) Prior Publication Data

US 2010/0237807 A1    Sep. 23, 2010

Related U.S. Application Data

(60) Provisional application No. 61/161,200, filed on Mar. 18, 2009.

(51) Int. Cl.
*B06B 1/06* (2006.01)
*H04R 31/00* (2006.01)

(52) U.S. Cl. ............ 367/140; 29/594; 310/300; 318/116

(58) Field of Classification Search .............. 367/93–94, 367/138, 140; 318/116; 29/594; 310/300; 601/2
See application file for complete search history.

(56) References Cited

U.S. PATENT DOCUMENTS

| | | | |
|---|---|---|---|
| 4,906,837 A | 3/1990 | Doneen et al. | |
| 4,936,649 A | 6/1990 | Lymer et al. | |
| 5,873,830 A | 2/1999 | Hossack et al. | |
| 5,921,933 A | 7/1999 | Sarkis et al. | |
| 6,004,832 A * | 12/1999 | Haller et al. | 438/50 |
| 6,106,472 A | 8/2000 | Chiang et al. | |
| 6,142,946 A | 11/2000 | Hwang et al. | |
| 6,246,158 B1 | 6/2001 | Ladabaum | |
| 6,251,075 B1 | 6/2001 | Hashimoto | |
| 6,280,704 B1 | 8/2001 | Schutt et al. | |
| 6,292,435 B1 * | 9/2001 | Savord et al. | 367/138 |
| 6,314,057 B1 | 11/2001 | Solomon et al. | |
| 6,320,239 B1 | 11/2001 | Eccardt et al. | |
| 6,328,696 B1 * | 12/2001 | Fraser | 600/459 |
| 6,342,891 B1 | 1/2002 | Fenster et al. | |
| 6,361,499 B1 | 3/2002 | Bates et al. | |
| 6,375,617 B1 | 4/2002 | Fraser | |
| 6,428,469 B1 | 8/2002 | Iddan et al. | |
| 6,443,901 B1 | 9/2002 | Fraser | |
| 6,458,084 B2 | 10/2002 | Tsao et al. | |

(Continued)

FOREIGN PATENT DOCUMENTS

EP    666483    1/1995

(Continued)

OTHER PUBLICATIONS

U.S. Appl. No. 12/727,143, filed Mar. 18, 2010, David F. Limmerhirt et al.

(Continued)

*Primary Examiner* — Eduardo Colon
(74) *Attorney, Agent, or Firm* — Jeffrey Schox

(57) ABSTRACT

A system and method for biasing a capacitive ultrasonic transducer (CMUT) device with a circuit that includes a CMUT that includes a first plate and a second plate that form a membrane structure; a circuit voltage source at a complementary metal-oxide-semiconductor (CMOS) compatible voltage; a bias voltage source that applies a bias voltage greater than a CMOS compatible voltage and is applied to the first plate; and readout electronics with an input connected on the second plate side of the circuit.

19 Claims, 3 Drawing Sheets

U.S. PATENT DOCUMENTS

| | | | |
|---|---|---|---|
| 6,461,299 B1* | 10/2002 | Hossack | 600/437 |
| 6,506,156 B1 | 1/2003 | Jones et al. | |
| 6,506,160 B1 | 1/2003 | Van Stralen et al. | |
| 6,540,981 B2 | 4/2003 | Klaveness et al. | |
| 6,546,279 B1 | 4/2003 | Bova et al. | |
| 6,547,731 B1 | 4/2003 | Coleman et al. | |
| 6,562,650 B2 | 5/2003 | Ladabaum | |
| 6,605,043 B1 | 8/2003 | Dreschel et al. | |
| 6,610,012 B2 | 8/2003 | Mault | |
| 6,667,245 B2 | 12/2003 | Chow et al. | |
| 6,795,374 B2* | 9/2004 | Barnes et al. | 367/138 |
| 6,939,531 B2 | 9/2005 | Schutt et al. | |
| 7,030,536 B2* | 4/2006 | Smith et al. | 310/309 |
| 7,314,445 B2 | 1/2008 | Wodnicki et al. | |
| 2003/0032211 A1* | 2/2003 | Ladabaum | 438/42 |
| 2003/0163046 A1 | 8/2003 | Nohara et al. | |
| 2003/0216621 A1 | 11/2003 | Alpert et al. | |
| 2004/0006273 A1 | 1/2004 | Kim et al. | |
| 2004/0225220 A1 | 11/2004 | Rich | |
| 2005/0033177 A1 | 2/2005 | Rogers | |
| 2005/0154300 A1 | 7/2005 | Wodnicki et al. | |
| 2005/0237858 A1 | 10/2005 | Thomenius et al. | |
| 2006/0058667 A1 | 3/2006 | Lemmerhirt et al. | |
| 2007/0038088 A1 | 2/2007 | Rich et al. | |
| 2007/0079658 A1* | 4/2007 | Wagner | 73/627 |
| 2007/0167811 A1 | 7/2007 | Lemmerhirt et al. | |
| 2007/0167812 A1 | 7/2007 | Lemmerhirt et al. | |
| 2008/0071149 A1 | 3/2008 | Rich | |
| 2008/0071292 A1 | 3/2008 | Rich | |
| 2009/0250729 A1 | 10/2009 | Lemmerhirt et al. | |
| 2010/0207485 A1* | 8/2010 | Dirksen et al. | 310/300 |
| 2012/0010538 A1* | 1/2012 | Dirksen | 601/2 |

FOREIGN PATENT DOCUMENTS

| | | |
|---|---|---|
| EP | 936144 | 8/1999 |
| GB | 2272762 | 5/1994 |
| JP | 2000-347072 | 12/2000 |

OTHER PUBLICATIONS

Meng-Hui Chen et al., Design and Characterization of a CMOS Micromachined Capacitive Acoustic Sensor, Sensors 2007 IEEE Oct. 28-31, 2007.

Meng-Hui Chen et al., Design and characterization of an air-coupled capacitive ultrasonic sensor fabricated in a CMOS process, Journal of Micromechanics and Microengineerings Jan. 2008.

Cianci et al., "Improvements Towards a Reliable Fabrication Process for cMUT," Microelectr. Eng. 67-68, pp. 602-608 (2003).

Eccardt et al., "Micromachined Ultrasound Transducers with Improved Coupling Factors from a CMOS Compatible Process," Ultrasonics 38, pp. 774-780 (2000).

Glassman, "Concrete is Learning New Tricks, Like Letting in the Light," New York Times, Aug. 10, 2004.

International Search Report, PCT/US2004/028326, mailed Oct. 12, 2004.

Masoliver, "Concrete That Lets in Light," Insight Mar. 2000, p. 18 and 19.

Nadal-Guardia et al., "Constant Charge Operation of Capacitor Sensors Based on Switched-Current Circuits," IEEE Sensors J., vol. 3. No. 6 (Dec. 2003).

Westberg et al., "Surface Micromachining by Sacrificial Aluminum Etching," J. Micromech., Microneng. 6, pp. 376-387, printed in the UK (1996).

* cited by examiner

SYSTEM AND METHOD FOR BIASING CMUT ELEMENTS

CROSS-REFERENCE TO RELATED APPLICATIONS

This application claims the benefit of U.S. Provisional Application No. 61/161,200 filed 18 Mar. 2009, titled "System and Method for Biasing CMUT Elements", which is incorporated in its entirety by this reference.

TECHNICAL FIELD

This invention relates generally to the field of ultrasound imaging, and more specifically to an improved system and method in the field of ultrasound imaging to allow transmit and receive mode CMUTs to be biased with voltages exceeding the limitations of CMOS circuit components.

BACKGROUND

A capacitive micromachined ultrasonic transducer (CMUT) device can be used to either transmit or receive ultrasonic acoustic signals. Signal transmission is accomplished by electrostatically deflecting the CMUT membrane and thereby storing elastic energy in the membrane. Upon release, this elastic energy is converted to kinetic energy and produces an acoustic pulse. Signal reception, on the other hand, occurs when the CMUT membrane is deflected by an acoustic pulse, causing the gap between the upper and lower electrodes to change. Both transmit and receive operations require a controlled electrical quantity, either charge or voltage, to be placed on the CMUT electrode pair. In transmit mode, the electrical signal applied to a CMUT typically consists of an RF (radio frequency) voltage waveform added to a constant DC (direct current) baseline voltage. In receive mode, only a DC voltage is typically applied to the CMUT.

In receive mode, a DC voltage applied between the upper and lower electrodes of a CMUT is important for several reasons. First, the DC voltage source provides an electric field that causes opposite charges to be stored on the two CMUT electrodes. The capacitor formed by the CMUT electrodes obeys the relationship $Q = C \cdot V$, where Q is the stored charge, C is the device capacitance and V is the applied voltage. According to this relationship, a higher DC voltage applied to the CMUT results in a larger quantity of charge initially stored on the CMUT. In receive mode, the gap between the electrodes changes in response to an impinging acoustic signal, causing the capacitance to change according to:

$$C = \frac{\varepsilon \cdot A}{d_0 - d(t)} \quad \text{(Eq. 1)}$$

where $d_o$ is the initial gap between the electrodes, $d(t)$ is the time-varying membrane displacement induced by the acoustic wave, A is the geometric area of the overlap between electrodes, and $\in$ is the dielectric constant of the material between the electrodes. The output current from the CMUT corresponds to the first derivative of charge with respect to time. Because both the capacitance and voltage can vary with time, the expression for the output current of the CMUT becomes:

$$I = \frac{dQ}{dt} = C \cdot \frac{dV}{dt} + V \cdot \frac{dC}{dt} \quad \text{(Eq. 2)}$$

In this expression, it becomes clear that a larger applied voltage V will result in a larger output current I, for a given acoustically induced capacitance change.

The second reason the DC voltage applied to the CMUT is important is that the DC voltage causes electrostatic attraction between the plates of the structure, causing the gap to be reduced as the DC voltage increases. According to Eq. 1, the capacitance of the CMUT increases as the gap is reduced, and, according to Eq. 2, the output current increases with increasing capacitance. The DC voltage on the CMUT reduces the gap until the point where the electrostatic attraction between the plates exceeds the restoring spring force of the membrane, causing the membrane to collapse. This voltage is known as the pull-in voltage, and is typically equal to the voltage required to reduce the gap by ⅓, as discussed in Y. Huang, A. Ergun, E. Haeggstrom, M. Badi, B. Khuri-Yakub, "Fabricating Capacitive Micromachined Ultrasonic Transducers With Wafer-Bonding Technology," *Journal of Microelectromechanical Systems*, Vol. 12, No. 2, April 2003, which is incorporated in its entirety by this reference. CMUTs are typically biased at approximately 75 to 90% of the pull-in voltage, in order to take advantage of the reduced gap while maintaining a safe margin before membrane collapses. The benefits and detriments of increasing the bias voltage beyond the pull-in voltage and operating in the so-called "collapse" or "collapse-snapback" modes are discussed by B. Bayram, O. Oralkan, A. Ergun, E. Haeggstrom, G. Yaralioglu, B. Khuri-Yakub in "Capacitive Micromachined Ultrasonic Transducer Design for High Power Transmission," *IEEE Transactions on Ultrasonics, Ferroelectrics, and Frequency Control*, Vol. 52, No. 2, February 2005, and US Published Application No. 2005/0234342, which are incorporated in their entirety by this reference.

The preceding discussion suggests that the DC voltage applied to a CMUT should be as large as possible to produce the maximum output signal. The range of acceptable DC voltage values is constrained, however, by the voltage limits of the given fabrication technology. A primary advantage of CMUTs as compared to piezoelectric ultrasound transducers is the possibility of integrating CMUTs on a common substrate with CMOS circuits such as amplifiers, switches, and analog-to-digital converters. Therefore, most CMUTs are manufactured using materials and fabrication processes that are, in principle, compatible with CMOS circuits. Standard CMOS circuit components such as transistors and capacitors are, however, damaged by voltages exceeding a few tens of volts. As shown in FIG. 1, in order to apply a large DC bias 112 to a CMUT device 110 without damaging the input transistors of the amplifier 124, a DC blocking capacitor 130 can be used, as indicated by $C_{block}$ 130. This configuration 100 is typical for CMUT readout circuits built using discrete (off-chip) components, since large value capacitors 130 with large voltage limits are available. By contrast, when implementing readout circuitry on chip, large capacitors require prohibitive amounts of circuit real estate, and these capacitors 130 are intended to be subjected only to circuit-compatible voltages (<30V).

Besides the challenges introduced by the integration of CMOS electronics on-chip with CMUTs, complications can arise due to trapped mobile charge in layers between CMUT plates, resulting from the constant application of a high-voltage bias to the CMUT. Since increasing the bias voltage ideally increases the sensitivity of a CMUT, these charging problems are exacerbated when aiming for high-sensitivity CMUT operation. One solution to this problem has been to change the CMUT structure, such that the surface area of dielectric layers between CMUT plates is reduced, thereby scaling back the amount of charge that can be trapped, as discussed in Y. Huang, E. Haeggstrom, X. Zhuang, A, Ergun, B. Khuri-Yakub, "A Solution to the Charging Problems in Capacitive Micromachined Ultrasonic Transducers," *IEEE Transactions on Ultrasonics, Ferroelectrics, and Frequency Control*, Vol. 52, No. 4, April 2005 and US Published Application No. 2005/0228285, which are incorporated in their entirety by this reference. Depending on the precise structure of the CMUT, this solution can require additional photolithography steps and etching steps during the CMUT fabrication process, increasing the expense of the transducer device and reducing cost-savings provided by CMUT technology.

Thus, there is a need in the field of ultrasound imaging to create an improved system and method for reducing the effects of trapped charge in CMUTs. This invention provides such an improved system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 2:
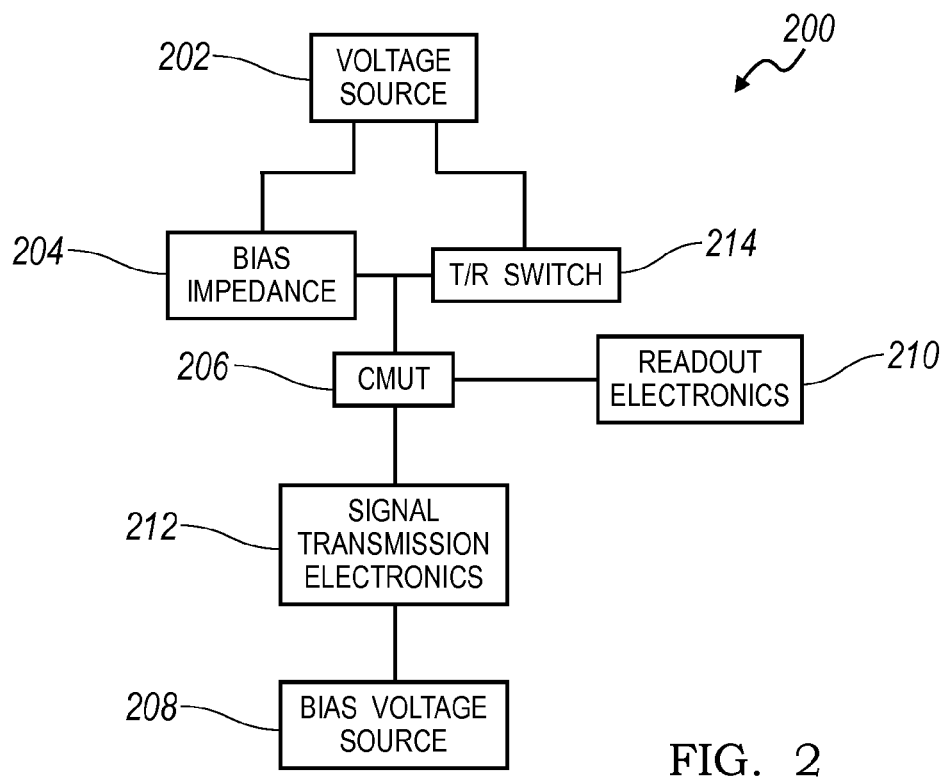
FIG. 2 is a schematic diagram of the preferred embodiment of the invention.
Figure 3:
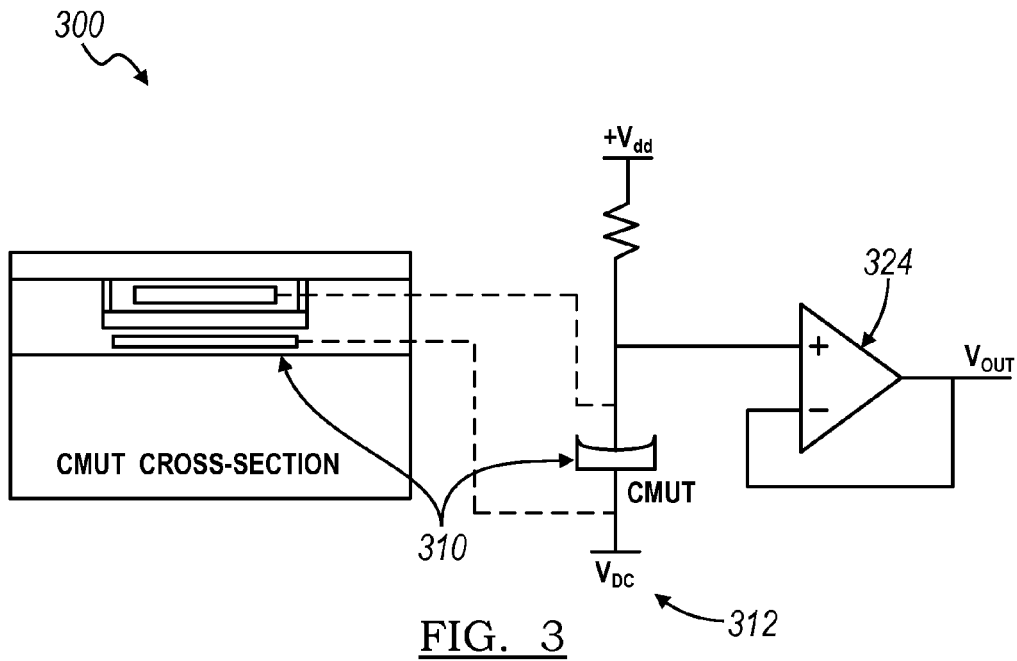
FIG. 3 is a circuit diagram of a first variation of the preferred embodiment of the invention.
Figure 4:
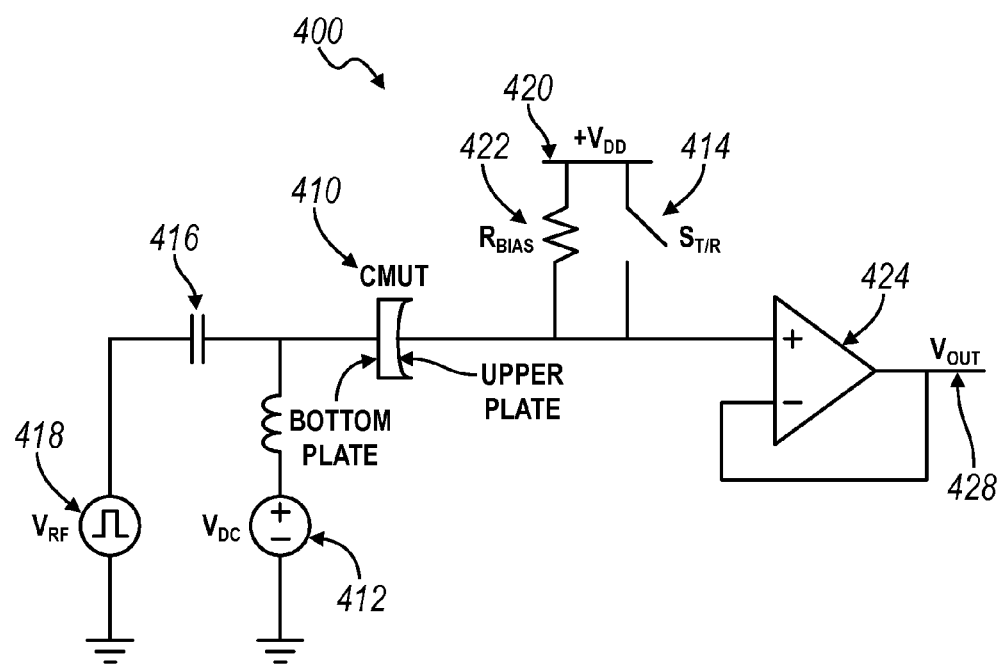
FIG. 4 is a circuit diagram of a second variation of the preferred embodiment of the invention.

As shown in FIGS. 2-4, the preferred system for a CMUT biasing scheme of the preferred embodiments allows CMUTs to be biased with voltages exceeding the limitations of CMOS circuit components and improve the received signal strength. In one variation, a DC bias is applied to a first plate of the CMUT. In another variation, RF and DC signals may be applied to a CMUT in both transmit and receive modes without exceeding the limitations of the CMOS circuit components through the use of a transmit/receive (T/R) switch. The increased bias voltage improves transmit and receive signal strength from CMUTs produced by CMOS processes, preferably resulting in cheaper and more compact CMUTs with higher signal quality.

As shown in FIG. 2, the preferred system for a CMUT biasing scheme includes a voltage source 202, a bias resistance 204, a CMUT 206, a DC bias voltage 208, and readout electronics 210. One variation on the preferred embodiment further includes RF signal transmission electronics 212 and at least one transmit/receive (T/R) switch 214.

The voltage source 202 of the preferred embodiments functions to provide a steady-state voltage at the input of the CMOS electronics. The voltage source 202 is preferably producing voltages within the standard operating range of CMOS electronics, but alternatively may operate in any voltage range. The voltage source 202 could alternatively be replaced with a direct connection to electrical ground for the system. The voltage source 202 is preferably on the second plate (or electrode) of the CMUT 206 or alternatively on the second plate side of the CMOS electronics.

The bias impedance 204 of the preferred embodiments functions to convert the receive-mode current output of the CMUT 206 to a voltage output that can be processed by the readout electronics 210. The bias impedance 204 is preferably a resistor, but may be a potentiometer, a circuit element with a complex impedance, or any other circuit element that could function to convert the output signal of the CMUT 206 to a signal that can be processed by the readout electronics 210. Alternatively, the bias impedance 204 can be eliminated from the system, such as if the readout electronics 210 are configured to receive a current input rather than a voltage input (for example, a transimpedance amplifier).

The CMUT 206 of the preferred embodiments functions to receive and transmit ultrasound signals. During transmit operation, the complex impedance of the CMUT is preferably used with the "on" resistance of the T/R switch 214 to divide the voltage of the RF transmission electronics 212. The divided voltage is preferably at an acceptable level for the readout electronics. The CMUT 206 preferably consists of a micromachined metal/dielectric membrane structure with oppositely charged plates separated by an air or vacuum gap. Because the CMUT 206 preferably consists of a micromachined metal/dielectric membrane structure with oppositely charged plates separated by an air or vacuum gap, the device preferably has a much higher breakdown voltage than a typical on-chip capacitor with plates separated by only a thin dielectric layer. The two plates (or electrodes) may be thought of as a first plate and a second plate. The first plate is preferably thought of as the "bottom" plate resting on a dielectric layer of the CMOS device, and the second plate is the "upper" plate located nearer to the surface of the chip, and is preferably deflected in response to impinging acoustic signals. However in a variation, the first plate may alternatively be the plate located near the surface of the chip, and is deflected in response to impinging acoustic signals, and the second plate is preferably the bottom plate resting on a dielectric layer of the CMOS device. This variation may have additional benefits applying the large bias voltage to the upper plate to avoid an additional breakdown related to the bottom plate and the dielectric. Though the plates may be positioned or designed in any suitable arrangement. The CMUT 206 may also function as a capacitor to protect the readout electronics 210 by blocking high DC voltages from the bias voltage source 208 and the CMOS electronics.

The bias voltage 208 of the preferred embodiments functions to store charge on the CMUT, causing current to flow when the capacitance of the CMUT changes in response to a received acoustic signals. Preferably, an increased voltage across the CMUT would also increase the received signal (see Equation 2 above). The magnitude of the voltage drop across the CMUT is preferably the difference between the voltage level of the bias voltage 208 minus the voltage level of the voltage source 202. Thus the magnitude of the bias voltage 208 is preferably greater than the magnitude of the voltage source 202, and the magnitude of the bias voltage 208 may additionally be greater than a CMOS compatible voltage. A CMOS compatible voltage is preferably a voltage that exceeds a typical safe voltage rating for the CMOS compatible components. The CMOS compatible voltage is preferably equal to or substantially similar to the source voltage 202. Examples of CMOS compatible voltage limits include 1.8V, 3.3V, 5V, 12V or any suitable CMOS compatible voltage. The bias voltage 208 is preferably applied to the first plate of the CMUT 206 (or the plate opposite from where the readout electronics monitor the signal), enabling the CMUT 206 itself to act as a blocking capacitor. Since the bias voltage 208 is preferably DC (or a low frequency alternating voltage), the second plate of the CMUT 206 is not exposed to the high voltage and the readout electronics 210 are protected. The bias voltage 208 is preferably limited by the breakdown voltage of the dielectric layer(s) underlying the first electrode. If the first plate rests on a somewhat thick (0.5-2.0 µm) dielectric layer, such as field oxide in a CMOS process, this breakdown voltage preferably exceeds 500V. The first electrode may alternatively be the upper electrode, and preferably avoids the issue of the breakdown voltage of the dielectric layer(s), except for any dielectric layers that may be present between the first and second electrodes. Both variations preferably would have first and second plate breakdown limitations. The bias voltage 208 is preferably an off board voltage applied through a connection to the CMOS electronics, but the bias voltage 208 may be applied in any suitable manner The readout electronics 210 of the preferred embodiments function to process the signals received from the CMUT 206. The readout electronics 210 preferably amplify or otherwise condition the signal received from the CMUT, but the readout electronics 210 may alternatively obtain the unconditioned receive signal of the CMUT for any suitable process. The readout electronics 210 are preferably single-stage or multiple-stage CMOS amplifier circuits but may be any suitable circuits. The readout electronics 210 preferably have an input connected to the second plate of the CMUT, or alternatively on the second plate side of the CMOS electronics.

The RF signal transmission electronics 212 of the preferred embodiments function to apply to the CMUT 206 a large radio-frequency (RF) signal which is added to a large bias voltage provided by the bias voltage source 208. The peak amplitude of the RF signal can be as large or larger than the bias voltage from the bias voltage source 208, although the peak amplitude of the RF signal is more typically in the range of 15-75 volts. While a capacitor can be used to completely block DC voltages, the capacitor partially passes RF voltages. Therefore the RF voltage has the potential to damage the readout electronics 210. A transmit/receive switch 214 is preferably used to prevent such damage.

The transmit/receive (T/R) switch 214 of the preferred embodiments functions to protect the readout electronics 210 during the RF transmit pulses. For example, the T/R switch 214 may be inserted between the CMUT 206 and the readout electronics 210 to disconnect the readout electronics 210 when a transmit pulse is connected to the CMUT 206. Alternatively, protection diodes may be inserted at the input of the readout electronics 210 to limit the input-node voltage swing to voltages that can be tolerated. T/R switching 214 is preferably implemented in a standard low-voltage CMOS process. For a CMUT 206 with on-chip electronics, a T/R switch 214 would need to be implemented using CMOS transistors, which could be damaged by applying large RF voltages across them. On-chip protection diodes may be used, but these diodes consume a large amount of circuit area, making this approach cumbersome if CMUTs are to be included on the same chip as the protection electronics.

Additionally, the biasing schemes shown in FIGS. 2-4 may be used to resolve charging problems that may arise while holding CMUTs at constant DC bias. The solution to the charging problem is to use a bias source 208 applied to the first plate (or the plate opposite from where the readout electronics 210 monitor the signal) of the CMUT structure 206 that alternates polarity periodically during the ultrasound imaging procedure, as opposed to a DC bias source 208.

As shown in FIG. 3, the circuit configuration 300 allows receive-mode CMUTs to be biased with voltages exceeding the limitations of CMOS circuit components. A large DC bias voltage 312 is preferably applied to the first plate of the CMUT. The magnitude of the bias voltage 312 is preferably equal or greater in magnitude than voltages that typically would damage the CMOS electronics (i.e., greater than CMOS compatible voltages). This scheme is appropriate for receive-mode operation of the CMUT. The DC bias 312 is preferably applied to the first plate (or the plate opposite from where the readout electronics monitor the signal) of the CMUT 310, enabling the CMUT 310 itself to act as a blocking capacitor, removing the DC voltage and protecting the input of the CMOS amplifier 324.

Figure 1:
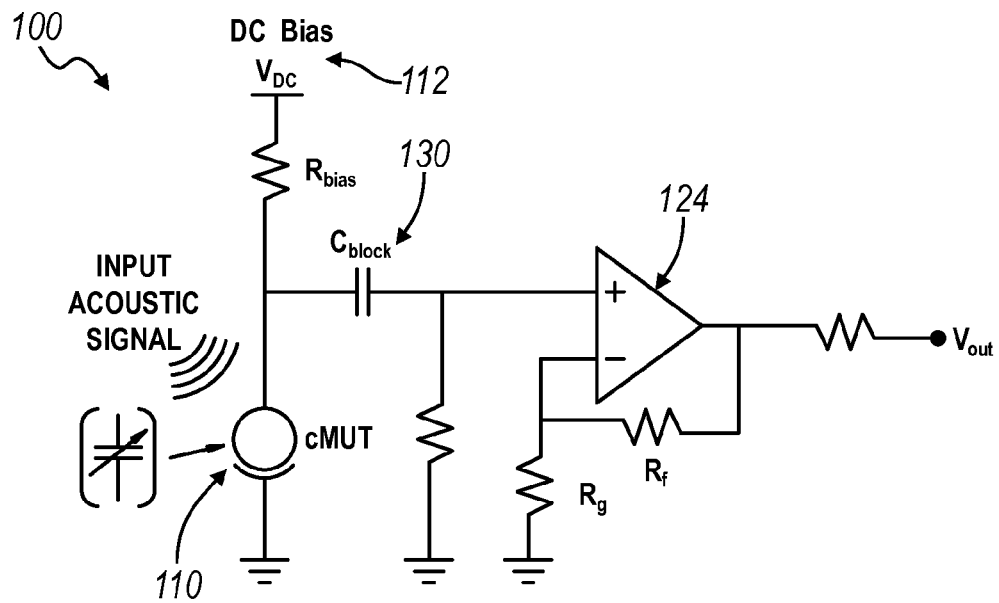
FIG. 1 is a circuit diagram of the Prior Art.

As shown in FIG. 4, a CMUT 410 is preferably used in both receive and transmit mode. In transmit mode, a large radio-frequency (RF) signal 418 is applied to the first plate of the CMUT 410 in addition to the large DC bias voltage 412. The peak amplitude of the RF signal 418 can be as large as or larger than the DC bias voltage 412, although the peak amplitude of the RF signal 418 is more typically in the range of 15-75 volts. While a capacitor 416 can be used to completely block DC voltages, the capacitor partially passes RF voltages. Therefore if an RF voltage were applied to the first or second plate of the CMUT 110, 310 in the configurations of FIGS. 1 and 3, respectively, the input of the CMOS amplifier 124 and 324 respectively, would be exposed to the potentially damaging signal. Preferably, a transmit/receive (T/R) switch 414 is used to protect the electronics during the transmit pulses as described below. Alternatively, protection diodes may be inserted at the input of the amplifier to limit the input-node voltage swing to voltages that can be tolerated by the electronics. For a CMUT 410 with on-chip electronics, a T/R switch 414 would need to be implemented using CMOS transistors, which could be damaged by applying large RF voltages 418 across them. On-chip protection diodes may be used, but these diodes consume a large amount of circuit area, making this approach cumbersome if CMUTs are to be included on the same chip as the protection electronics.

As shown in FIG. 4, the system 400 of a second variation of the preferred embodiment of the invention preferably includes a transmit-receive switch 414 to allow high transmit voltages in the presence of low-voltage CMOS readout electronics. More preferably the receive configuration utilizes a T/R switch 414 to protect the CMOS circuits from high voltages applied to the first plate (or the plate opposite from where the readout electronics 428 monitor the signal) of the CMUT 410. T/R switching 414 is preferably implemented using components manufactured in a standard low-voltage CMOS process. The T/R switch 414 is preferably a CMOS transistor device. The T/R switch preferably has an open and closed state. The open and closed state may alternatively be thought of as low and high impedance states and would preferably provide two effective resistance values.

In transmit mode, the switch, $S_{T/R}$ 414 is closed (i.e., in a low-impedance state), the radio-frequency (RF) pulse 418 is applied to the first plate (or the plate opposite from where the readout electronics 428 monitor the signal) of the CMUT 410, and the second plate of the CMUT 410 is preferably connected by the low-impedance path through the switch $S_{T/R}$ 414 to the voltage source $V_{DD}$ 420. In one variation, $V_{DD}$ 420 may be replaced by a connection to ground. In transmit mode, a voltage divider is formed between the preferably higher complex impedance of the CMUT 410 and the preferably lower impedance of the closed switch $S_{T/R}$ 414. This voltage division causes a preferably greater fraction of the RF pulse amplitude $V_{RF}$ 418 to fall across the CMUT 410 and a preferably lesser fraction of the RF pulse amplitude $V_{RF}$ 418 to fall across the switch $S_{T/R}$ 414. The preferably lesser fraction of the RF pulse amplitude that falls across the switch $S_{T/R}$ 414 has a preferably low voltage (i.e. less than 15V), which will not cause damage to CMOS components such as the switch $S_{T/R}$ 414 and the inputs to the readout electronics 424. In the frequency band of interest, 1 to 10 MHz, the magnitude of the CMUT impedance preferably ranges from 5.0 kΩ to 3.5 MΩ (assuming the CMUT capacitance together with its parasitic capacitance ranges from 50 femtofarads to 3.0 picofarads). If the "on" resistance of $S_{T/R}$ 414 is less than approximately 100Ω, less than 5V will appear at the input of the op-amp 424 for RF pulse amplitudes up to 250V when the switch $S_{T/R}$ 414 is turned on. In this configuration, the CMUT 410 in combination with the T/R Switch $S_{T/R}$ 414 preferably protects the CMOS circuitry from the high RF pulses 418 applied to the first plate (or the plate opposite from where the readout electronics monitor the signal) of the CMUT 410 during transmit mode. During a high voltage pulse, neither the readout electronics 424 input nor the CMOS switch 414 will be subjected to voltages higher than 5V. The maximum current through the switch 414 would be less than 50 mA, even for a 250V 10 MHz signal and 3.0 pF of capacitance. In a more typical scenario, the current would be less than 1 mA. These values are well within the range for conventional CMOS, enabling transmit/receive operation from a CMUT 410 to be preferably integrated on the same CMOS chip with circuits.

In receive mode, the switch, $S_{T/R}$ 414 is open (i.e., in a high-impedance state). The second plate of the CMUT 410 is preferably connected to the voltage source $V_{DD}$ 420 through the high-impedance path created by the switch $S_{T/R}$ 414 in its "off" state. In one variation, $V_{DD}$ 420 may be replaced by a connection to ground. Because the high-impedance path of an open CMOS switch is difficult to precisely control, it may be desirable to place a fixed-value bias resistor 422 in parallel with the switch $S_{T/R}$ 414. In receive mode, the CMUT 410 produces a current output in response to an impinging acoustic signal. This current preferably flows through the bias resistor 422, causing a voltage drop across the resistor 422, which is the output signal processed by the readout electronics 424.

Figure 5:
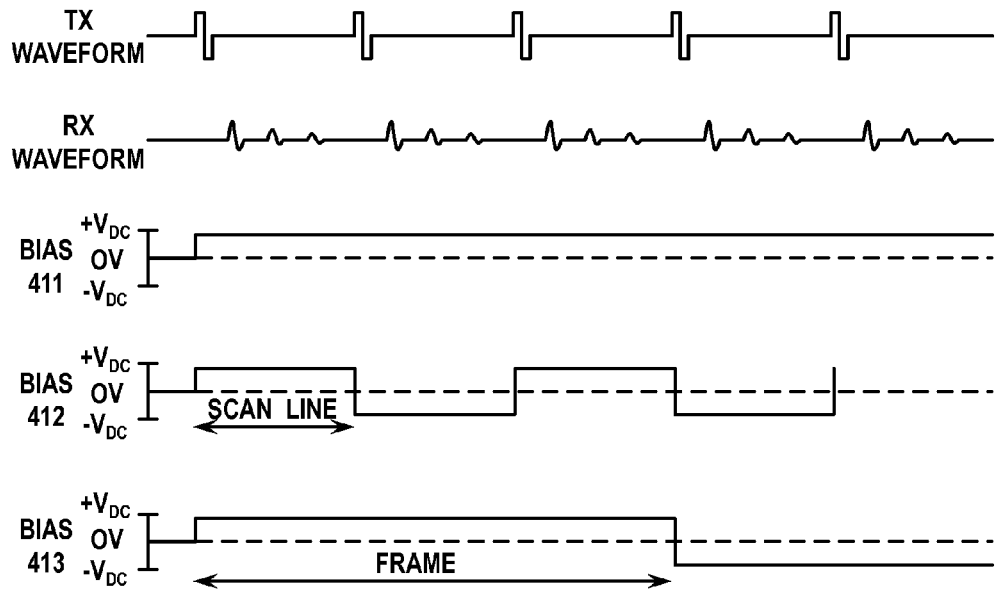
FIG. 5 is a collection of example waveforms of both the prior art a preferred embodiment of the invention, and a variation of the preferred embodiment of the invention.

FIG. 5 shows three example sequences of transmitting and receiving signals for capturing an ultrasound image. Typically in the art, a CMUT bias voltage will remain constant for the duration of the imaging procedure as shown in the waveform 'Bias 411.' Preferably, the constant bias voltage is replaced with a voltage that changes polarity each time a new scan-line is captured, as shown in the waveform 'Bias 412.' Alternatively, the polarity could be changed less frequently, for example each time a new frame or series of frames is captured, as shown in waveform 'Bias 413.' The alternating polarity of the bias voltage preferably causes the CMUT to be exposed to opposite electric fields for equal amounts of time, resulting in zero net change in electric field caused by trapped charge, and thus zero net change in sensitivity over time. The bias voltage may alternatively be changed at a set frequency. This frequency is preferably significantly slow enough that the alternating current can be filtered. The frequency range of the alternating bias voltage is preferably between 50 and 200 KHz, though any suitable frequency may be used. The polarity of the electric field does not impact the performance, since the unsigned magnitude of the voltage drop across the CMUT determines the electrostatic force between plates. Therefore, applying a bias that alternates polarity at a low frequency reduces or solves the charging problem in CMUTs without costly changes in electronics or structures on-chip.

Figure 6:
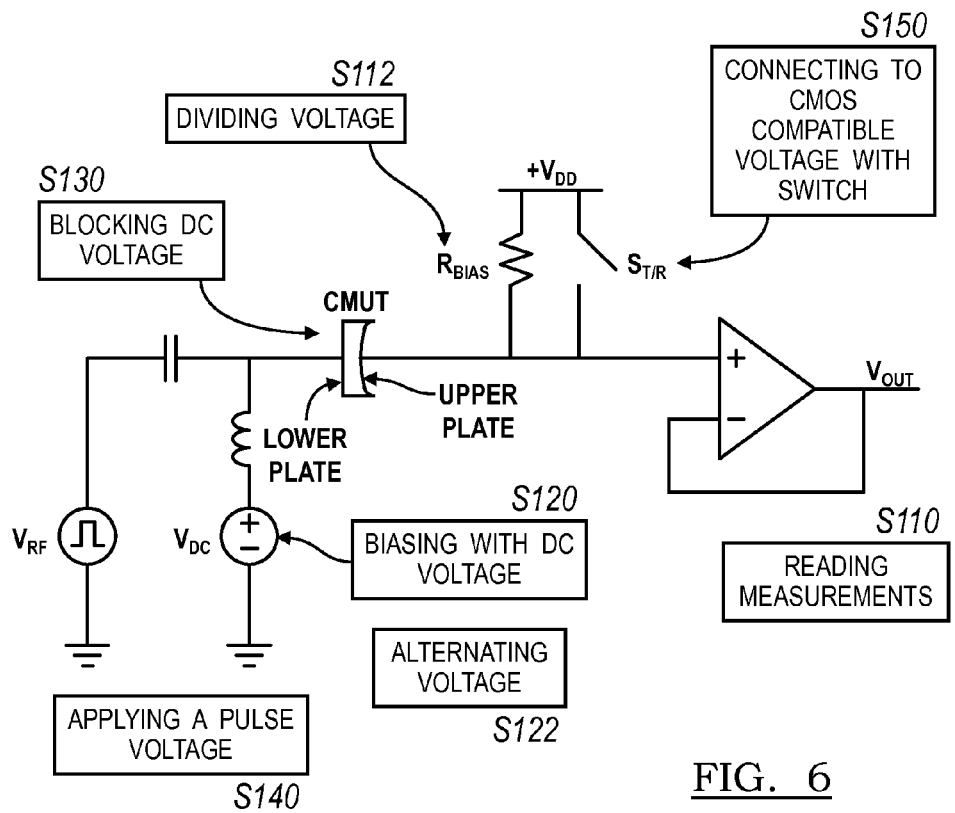
FIG. 6 is flow chart representation of a method of a preferred embodiment of the invention.

As shown in FIG. 6, a method for biasing a CMUT element of a preferred embodiment preferably includes reading measurements from a connection on the second plate side of a CMUT S110, biasing the first plate of the CMUT with a direct current (DC) voltage source S120, and blocking the biasing DC voltage source S130. The method functions to increase the sensitivity of the CMUT by operating the CMUT at a higher voltage, while protecting CMOS components. As reflected in Eq. 2, increased voltage increases the current caused by changing capacitance (i.e., deflections of the CMUT membrane). The CMUT can preferably be operated in a receive mode (when signals are sensed by the CMUT and read by the readout electronics) or in a transmit mode (when a signal is transmitted by the CMUT). Additionally, the method preferably includes applying a pulse voltage signal to the first plate of the CMUT S140 and connecting a node on the second plate side of the CMOS circuit to a CMOS compatible voltage by toggling a switch S150. Steps S140 and S150 preferably function to increase the transmission strength of the CMUT while protecting CMOS components used during the transmit mode of the CMUT. The method is preferably implemented with a system described above but may alternatively be implemented by any suitable system.

Step S110, which includes reading measurements from a connection on the second plate side of a CMUT, functions to condition a signal received from the CMUT. The signal from the CMUT is preferably amplified or otherwise conditioned. The signal may additionally be digitized. Additionally, the method may include dividing the voltage across the CMUT with a biasing impedance on the second plate side of the CMUT S112 (i.e., creating a voltage divider that includes the CMUT). The biasing impedance may be a distinct electrical component (preferably a resistor) or it may consist of the inherent impedance of the T/R switch itself, either in the open state or the closed state. A bias impedance (preferably a bias resistor) may additionally connect a voltage source to a node above the second plate of the CMUT where the readout electronics and the CMUT connect, as shown in FIGS. 2-4. A node is preferably any suitable electrical connection.

Step S120, which includes biasing the first plate of the CMUT with a voltage source, functions to induce a charge on the CMUT, creating an output current when the capacitance of the CMUT changes in response to an acoustic signal. The high voltage applied to the CMUT preferably increases the sensitivity of the CMUT when sensing the incoming signals. The biasing voltage is preferably higher than a CMOS compatible voltage (a voltage where the readout components would fail). The first electrode is preferably positioned on a thick (e.g., 0.5-2.0 μm) dielectric layer, such as a field oxide in a CMOS process, which preferably allows greater voltages to be applied to the first plate. For example, the device would have a breakdown voltage close to or exceeding 500V when the first plate rests on the field oxide of a CMOS process. The breakdown voltage of the CMUT would preferably be limited to a voltage that would cause arcing or current flow between the first and second plates of the CMUT. The biasing voltage may be a direct current (DC) voltage source (e.g., applying a steady state voltage). Alternatively, the method may include alternating the polarity of the biasing voltage source S122, which functions to prevent charge buildup in the CMUT. The biasing voltage is preferably alternated at a low frequency, and preferably exposes the CMUT to opposite electric fields for substantially equal amounts of time. The amounts of time spent in each polarity may alternatively be adjusted to be unequal to compensate for unequal mobility of positive and negative charge carriers within the CMUT layers. The biasing voltage is preferably alternated when a new scan-line is captured, new frame is captured, series of frames are captured, or with any suitable receiving event. The DC voltage may alternatively be alternated according any suitable rule.

Step S130, which includes blocking the biasing voltage source, functions to protect the CMOS components from the large voltages of the biasing voltage source. Since the biasing voltage is DC or alternatively a low frequency alternating current voltage source and does not alternate at a high frequency, a blocking capacitor can preferably block (or filter) the large voltage. More preferably, the CMUT acts as the blocking capacitor. The second plate is preferably not exposed to high voltages and the readout electronics are preferably protected. Any suitable protection circuitry may alternatively be used to protect the readout electronics.

Step S140, which includes applying a pulse voltage signal to the first plate of the CMUT, functions to generate the signal for CMUT transmission. The pulse voltage preferably includes whatever signal should be transmitted by the CMUT. The pulse voltage preferably transmits radio frequency signals but any suitable frequency range may alternatively be transmitted. The pulse voltage signal is preferably in the range of 15-75 volts but may alternatively be a high voltage similar to or greater than the amplitude of the biasing DC voltage. Because the voltage of the RF voltage signal is preferably greater than CMOS compatible voltages, the RF voltage signal may damage the readout components. The protection of Step S150 is preferably used to protect a circuit, though any suitable circuit protection may be used such as using a protection diode at the input of the readout electronics. The RF voltage signal is preferably activated when in transmit mode.

Step S150, which includes connecting a node on the second plate side of the CMOS circuit to a CMOS compatible voltage by toggling a switch, functions to protect the readout electronics. Preferably, the second plate of the CMUT and the input of the readout electronics may have a common node (with any suitable electronics such as a protection diode in-between). The connection made by the toggling the switch is preferably made to a CMOS compatible voltage source such as the DC voltage source powering the CMOS circuits. The connection may alternatively be made to ground or any suitable CMOS compatible voltage. The switch preferably has an impedance that forms a voltage divider with the CMUT when closed. With the complex impedance of the CMUT and the operation frequency range (1-10 MHz) a voltage less than 5V is preferably designed to appear at the input of the readout electronics.

As a person skilled in the art will recognize from the previous detailed description and from the figures and claims, modifications and changes can be made to the preferred embodiments of the invention without departing from the scope of this invention defined in the following claims.

I claim:

1. A system for biasing a capacitive ultrasonic transducer (CMUT) device comprising:
   a circuit including
      a CMUT that includes a first plate and a second plate that form a membrane structure;
      a bias voltage source that applies a bias voltage greater than a complementary metal-oxide-semiconductor (CMOS) compatible voltage and is applied to the first plate; and
      readout electronics with an input connected on the second plate side of the circuit; and
      a circuit voltage source that applies a CMOS compatible voltage to the readout electronics.

2. The system of claim 1, further comprising a bias impedance element between the circuit voltage source and the second plate.

3. The system of claim 2, wherein the bias impedance element is a resistor.

4. The system of claim 1, further comprising a direct current (DC) blocking capacitor between the bias voltage and the readout electronics.

5. The system of claim 4, wherein the CMUT acts as the DC blocking capacitor.

6. The system of claim 5, wherein the circuit is a CMOS circuit with a dielectric layer, wherein the first plate is on the dielectric layer.

7. The system of claim 4, further comprising a pulse signal voltage source that applies a transmit signal to the CMUT when in a transmit mode, and a transmit/receive (T/R) switch that toggles according to the transmit mode and a receive mode of the CMUT.

8. The system of claim 7, wherein the T/R switch selectively connects the input of the readout electronics and second plate of the CMUT to the circuit voltage source during transmit mode.

9. The system of claim 8, wherein the T/R switch has an impedance that in combination with a complex impedance of the CMUT creates a voltage divider during the transmit mode.

10. The system of claim 7, wherein the pulse voltage source has a voltage range greater than 15 volts.

11. The system of claim 7, wherein the readout electronics includes a protection diode before the input of the readout electronics.

12. The system of claim 4, wherein the bias voltage source applies a voltage magnitude greater than a CMOS compatible voltage.

13. The system of claim 12, wherein the bias voltage alternates polarity according to events related to receiving or transmission of a signal.

14. The system of claim 12, wherein the bias voltage alternates polarity at a frequency less than 100 kHz.

15. A method for biasing a capacitive ultrasonic transducer (CMUT) device with a first plate and a second plate comprising:
   reading measurements from a connection on the second plate side of the CMUT, wherein the measurements are made with complementary metal-oxide-semiconductor (CMOS) components;
   biasing the first plate of the CMUT with a voltage source that has a voltage magnitude greater than a CMOS compatible voltage; and
   blocking the biasing voltage source from the CMOS compatible components.

16. The method of claim 15, wherein blocking the biasing voltage includes the CMUT acting as a blocking capacitor.

17. The method of claim 15, further comprising applying a pulse voltage signal to the first plate of the CMUT wherein the voltage range of the pulse voltage signal is greater than the CMOS compatible voltage and includes connecting a node on the second plate side of the CMOS circuit to a CMOS compatible voltage by toggling a switch.

18. The method of claim 15, wherein the biasing voltage source is a direct current (DC) voltage source.

19. The method of claim 15, further comprising alternating the polarity of the biasing voltage source.

* * * * *